Sept. 30, 1930.  C. S. HALL  1,777,083
STORAGE AND CONVEYING MECHANISM FOR AIRCRAFT
Filed Sept. 7, 1926  3 Sheets-Sheet 1
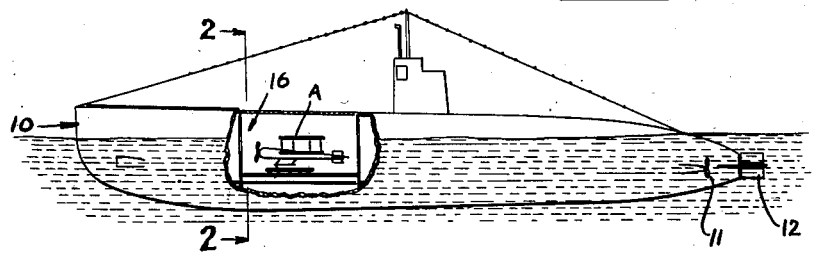
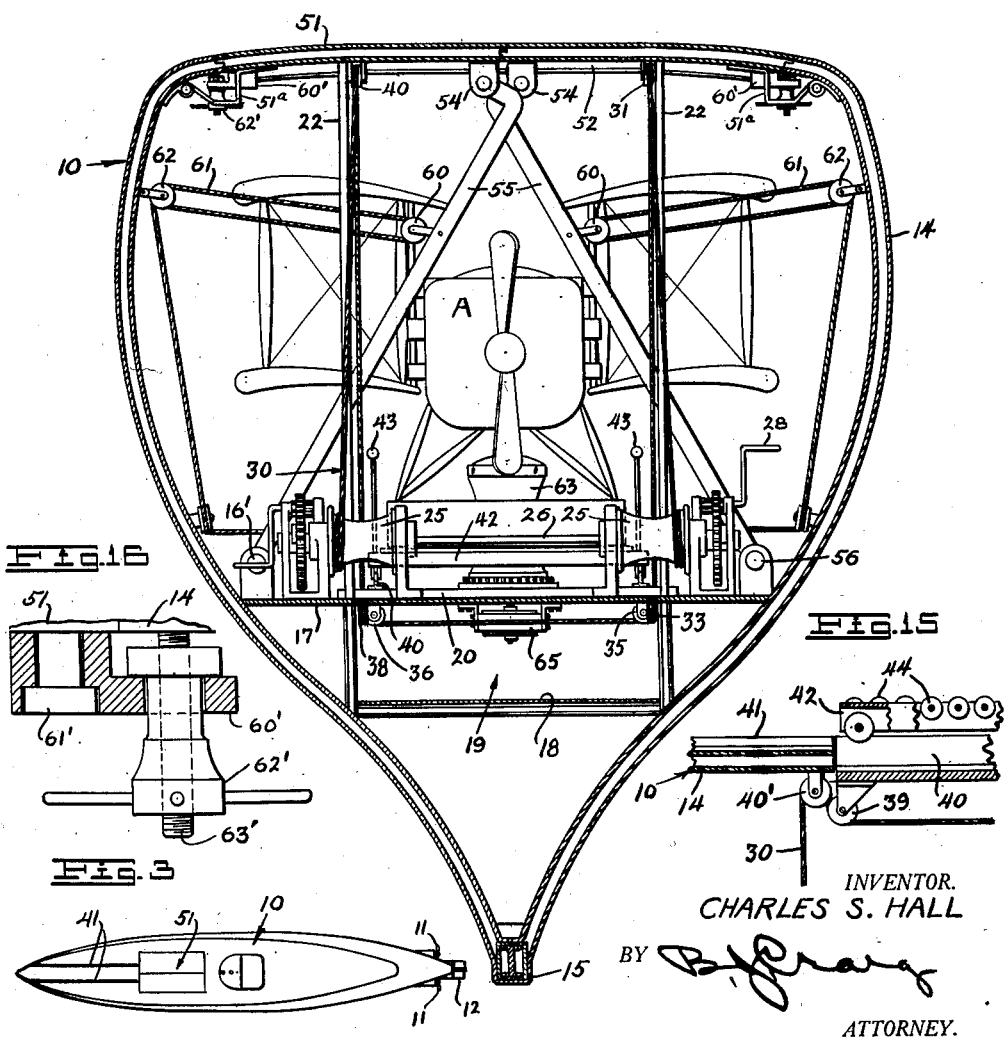
INVENTOR.
CHARLES S. HALL
BY
ATTORNEY.

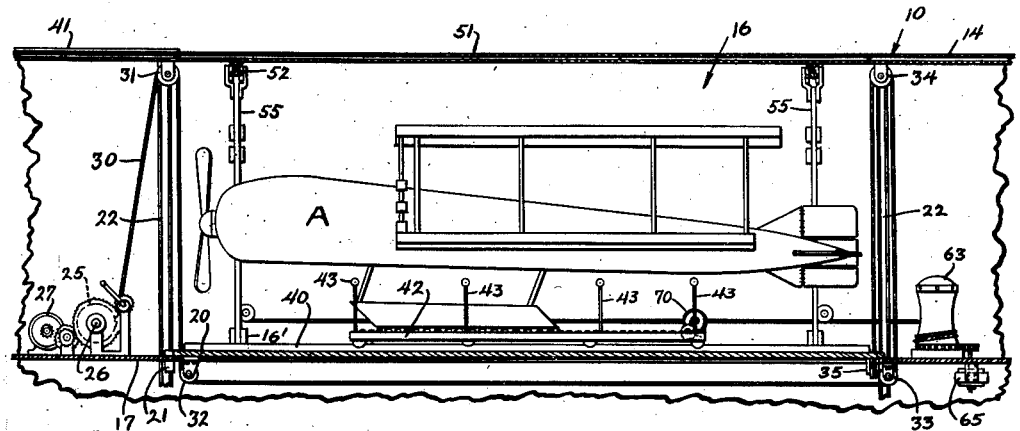

Sept. 30, 1930.                C. S. HALL                   1,777,083
               STORAGE AND CONVEYING MECHANISM FOR AIRCRAFT
                      Filed Sept. 7, 1926         3 Sheets-Sheet 3
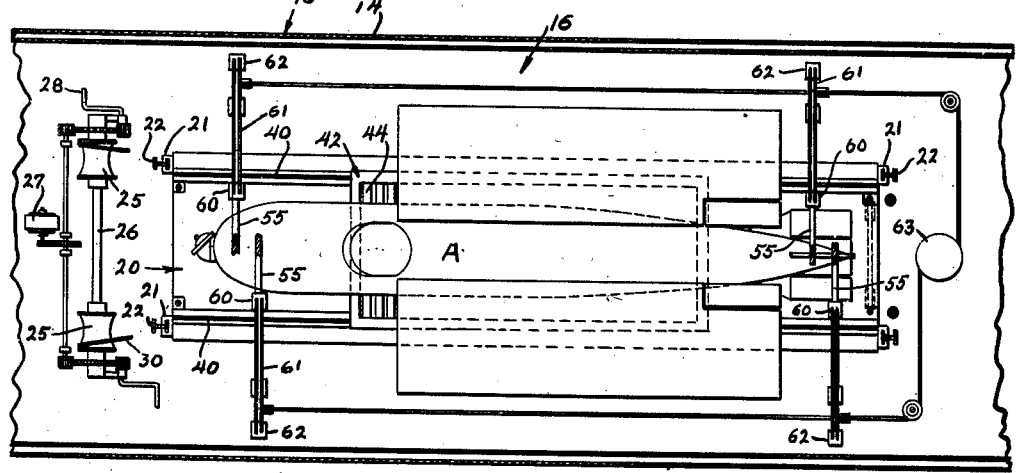
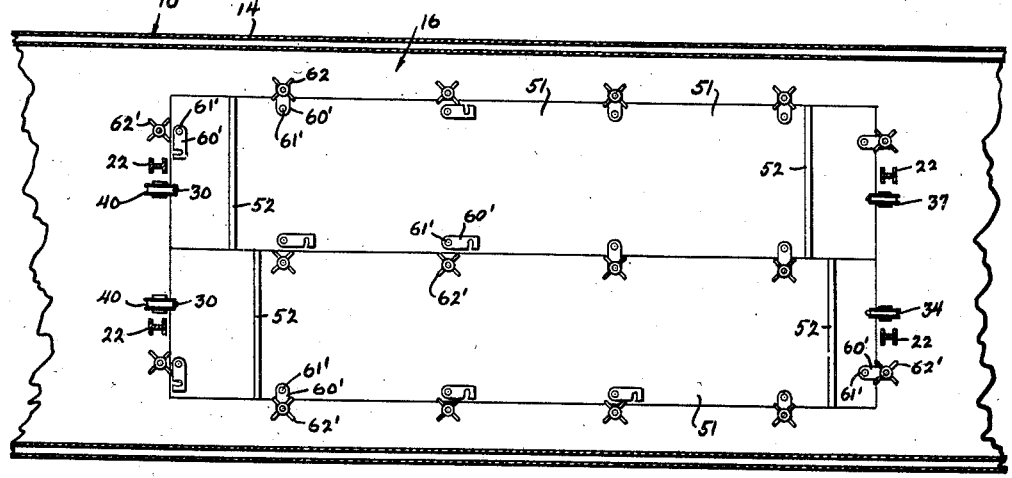
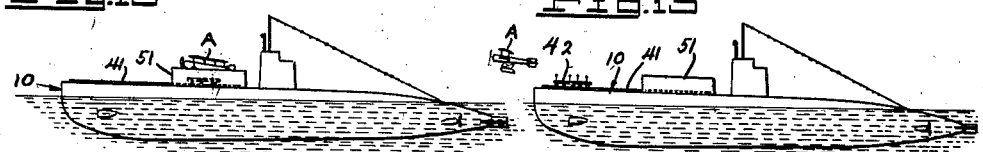
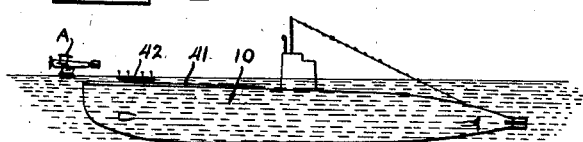
INVENTOR.
CHARLES S. HALL
ATTORNEY.

Patented Sept. 30, 1930

1,777,083

UNITED STATES PATENT OFFICE

CHARLES S. HALL, OF OAKLAND, CALIFORNIA, ASSIGNOR TO HALL ENGINEERING & AIRCRAFT CONSTRUCTION COMPANY, A CORPORATION OF NEVADA

STORAGE AND CONVEYING MECHANISM FOR AIRCRAFT

Application filed September 7, 1926. Serial No. 133,913.

This invention relates to a storage and conveying device for aircraft.

The general object of the invention is to provide a water-supported mechanism in which an aircraft may be stored and in which it can be transported if desired.

A specific object of the invention is to provide a submarine vessel having novel means thereon for enabling an aircraft to be stored therein.

Another object of the invention is to provide a submarine vessel having a novel storage compartment for housing an aircraft therein.

An additional object of the invention is to provide a submarine vessel having a storage compartment with novel means for loading an airplane into and removing it from the compartment.

Another object of the invention is to provide a novel means for discharging an aircraft from a submarine.

A further object of the invention is to provide for a novel hatch closure for a storage hold on a submarine.

Other objects of the invention will be apparent when the following description taken in connection with the accompanying drawings wherein:

Fig. 1 is a side elevation showing a submarine vessel equipped with my invention;

Fig. 2 is a section on line 2—2, Fig. 1;

Fig. 3 is a top plan view of the submarine;

Fig. 4 is an enlarged sectional view showing the storage chamber and associated parts;

Fig. 5 is a fragmentary sectional view showing the hatch operating mechanism;

Fig. 6 is a fragmentary perspective view showing the arms which move the hatch;

Fig. 7 is a fragmentary sectional view showing details of the hatch moving arms;

Fig. 8 is a sectional view showing the hatches open and showing an airplane being moved;

Fig. 9 is a perspective view showing the cables for lifting the elevator;

Fig. 10 is a top plan view of the elevator handling mechanism;

Fig. 11 is a bottom view showing the hatch covers;

Fig. 12 is a side elevation of the submarine showing an airplane disposed on the elevator;

Fig. 13 is a view similar to Fig. 12 showing the act of discharging an airplane;

Fig. 14 is a view similar to Fig. 13 showing a hydroplane adjacent to the movable car;

Fig. 15 is a fragmentary detail showing the movable car, and

Fig. 16 is a sectional detail.

Referring to the drawing, by referring characters, I have indicated my invention as embodied in a submarine vessel 10. As shown, the vessel is provided with propellers 11, and steering apparatus 12, but it will be understood that my invention may be used with stationary submersible vessels.

Referring again to the drawing, the body of the submarine is indicated at 14, and it may be provided with a keel 15, as shown.

The storage compartment for the aircraft is indicated generally at 16; this compartment may be located at any desired position in the vessel although I have shown it near the bow. The compartment has a floor 17 and a subfloor 18, disposed at a lower level than the floor 17 to provide a well 19. An elevator is shown at 20. This elevator is provided with guides 21 at the ends which engage I-beams 22 so that as the elevator is raised and lowered, it will be maintained at a horizontal position. The guides 21, and the I-beam 22 may be disposed in any suitable fashion although I have shown them at the ends of elevator platform 20.

In order to lift the elevator, I provide a pair of drums 25 which are disposed on a shaft 26, which is adapted to be driven on by a motor 27. A suitable hand crank 28 may also be used to drive the drums 25 when desired.

A cable 30 has one end, fastened to one of the drums, and has the other end fastened to the other drum. From one of the drums the cable 30 extends to a pulley 31, over which it passes, thence around a lower pulley 32 mounted on the elevator platform 20'. From the pulley 32 the cable passes to another pulley 33, whence it passes up and over a pulley 34, then down to a pulley 35 across to a pulley 36, up to a pulley 37, and down to a pulley 38, which like the pulley 33, is fastened to the floor. From the pulley 38, the cable passes to pulley 39, which like the pulleys 32, 35, and 36, are mounted on the elevator platform 20. From the pulley 39, the cable passes over the pulley 40', and back to the other drum 25.

As a result of this construction, when the cable drum rotates in one direction, the elevator will be raised, and when the drum is turned in a reverse direction the elevator will be lowered.

The elevator platform 20 is shown as provided with parallel tracks 40. These tracks 40, align with tracks 41, arranged upon the deck of the submarine as shown in Fig. 3. The tracks 40 serve to support a car 42 which is adapted to receive an airplane A. The car 42 is shown as provided with side standards 43, and on the top surface of the car 42 are the plurality of spaced parallel rollers 44 which are mounted on suitable anti-friction devices. The rollers 44 enable the airplane to be readily launched or stored.

Although in the previous description I have referred to an airplane, it will be understood I do not wish to be limited to the use of an airplane, but may use my invention with a hydroplane, a lighter than air, aircraft, or with any type of vehicle desired.

In order to provide a strong rigid closure for the hatch opening of the chamber 16, I provide a pair of opposed hatches 51, which are mounted on hinges 51ª. These hatches 51 are shaped to conform externally to the upper surface of the submarine and on the under surface are provided with guide members shown as I-beams 52. The lower webs of these I-beams, of which there are two on each hatch member, receive rollers 53, which are journalled on brackets 54, mounted in pairs on arms 55. The arms 55 are pivoted as at 56, to the floor of the chamber 16, and these arms 55, when the hatches are closed preferably assume the position shown in Fig. 5 so that the arms not only serve as means for lifting the hatch closures, but also serve to brace the hatch closures when the latter are closed.

In order to open the hatch closures, I provide the arms 55 with pulleys 60 over which cables 61 pass. The cables 61 each pass over pulleys 62, whence they extend to a winch 63 which may be operated by any of arms 64 or motor 65, as desired.

From the foregoing description it will be apparent that when the winch 63 is rotated, the arms 55 will be pulled outwardly thereby causing the roller 53 to slide along the I-beam 52 thereby lifting the hatch closures 51, so that complete access is had to the compartment 16.

It will also be noted that on account of the disposition of the arms 55, these arms are arranged over the fuselage of the aircraft A.

When it is desired to close the hatch, the winch 63 is turned in a direction to pay out the cable 61, so that the hatch may move to a closed position.

When the hatch is in closed position it will be held in that position by means of spaced closure fasteners 60', which are pivoted to the hatch closure at 61', and which are adopted to be swung about their pivots to operative position.

In order to hold the closure fasteners tight, I provide clamps 62' on these members. These clamps 62' are threaded onto pins 63' which are fixed to the under portion of the vessel. The clamps are secured to the lower portion of the hatch covers so that when the clamps 62' are tightened the hatch members will be pulled into engagement with the edges of the compartment, to hereby hold the parts in watertight relation.

In operating my invention the clearing lines of one end of the vessel are removed and the closure hatches are opened. To load an aircraft it is preferably taxid to the position shown in Fig. 14. The airplane is then pulled onto the car 42 and this car is then rolled along the track and onto the elevator platform. The wings are then folded if the aircraft A is provided with such wings after which the elevator is lowered and hatch closures are battened down.

To release the aircraft the hatch closures are opened, the elevator is raised and the aircraft is then prepared for flight. It may be launched directly into the water or it may be launched into the air by operating the car 42 along the rails.

If desired, the car 42 may be provided with a motor 70 and this motor may propel the car rapidly along the vessel to give a catapultic action for releasing the aircraft directly into the air.

What I claim is:

A submarine vessel having a plane outer deck and having a storage compartment therein, traction rails on the plane outer deck of said vessel, an elevator movable below said deck into said compartment, means for moving said elevator, traction rails on said elevator adapted to register with said deck rails when said elevator is in a raised position, a truck having wheels thereon adapted to engage said rails, an aircraft, said truck being adapted to receive an aircraft, said elevator being adapted to move said truck and an aircraft thereon vertically, said aircraft being adapted to be launched from said truck and taken aboard on said truck.

In testimony whereof, I hereunto affix my signature.

CHARLES S. HALL.